US010597328B2

(12) United States Patent
Ibrahim et al.

(10) Patent No.: US 10,597,328 B2
(45) Date of Patent: Mar. 24, 2020

(54) LIGHTWEIGHT CONCRETE

(71) Applicant: King Fahd University of Petroleum and Minerals, Dhahran (SA)

(72) Inventors: Mohammed Ibrahim, Dhahran (SA); Mohammed Salihu Barry, Dhahran (SA); Luai M. Alhems, Dhahran (SA); Aftab Ahmad, Dhahran (SA); Muhammad Kalimur Rahman, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 15/891,765

(22) Filed: Feb. 8, 2018

(65) Prior Publication Data
US 2018/0222798 A1     Aug. 9, 2018

Related U.S. Application Data

(60) Provisional application No. 62/456,776, filed on Feb. 9, 2017.

(51) Int. Cl.
| | |
|---|---|
| *C04B 28/04* | (2006.01) |
| *C04B 18/14* | (2006.01) |
| *C04B 14/18* | (2006.01) |
| *C04B 18/02* | (2006.01) |
| *C04B 111/26* | (2006.01) |
| *C04B 111/52* | (2006.01) |
| *C04B 111/23* | (2006.01) |
| *C04B 111/40* | (2006.01) |
| *C04B 111/00* | (2006.01) |
| *C04B 111/28* | (2006.01) |
| *C04B 111/50* | (2006.01) |
| *C04B 111/20* | (2006.01) |

(52) U.S. Cl.
CPC .............. *C04B 28/04* (2013.01); *C04B 14/18* (2013.01); *C04B 18/027* (2013.01); *C04B 18/146* (2013.01); *C04B 2111/00068* (2013.01); *C04B 2111/20* (2013.01); *C04B 2111/23* (2013.01); *C04B 2111/26* (2013.01); *C04B 2111/28* (2013.01); *C04B 2111/40* (2013.01); *C04B 2111/50* (2013.01); *C04B 2111/52* (2013.01); *C04B 2201/30* (2013.01); *Y02W 30/94* (2015.05)

(58) Field of Classification Search
CPC ..... C04B 14/18; C04B 18/027; C04B 18/146; C04B 28/04; C04B 2111/20; C04B 2111/23; C04B 2111/26; C04B 2111/28; C04B 2111/40; C04B 2111/50; C04B 2111/52; C04B 2111/00068; C04B 2201/30; Y02W 30/94
See application file for complete search history.

(56) References Cited

U.S. PATENT DOCUMENTS

| | | | |
|---|---|---|---|
| 4,771,488 A | 9/1988 | Markham | |
| 5,114,617 A | 5/1992 | Smetana et al. | |
| 5,356,446 A | 10/1994 | Smetana et al. | |
| 5,472,498 A | 12/1995 | Stephenson et al. | |
| 7,438,757 B2 | 10/2008 | Williams et al. | |
| 8,298,332 B2 * | 10/2012 | Dubey | C04B 20/1051 106/713 |
| 9,120,702 B2 | 9/2015 | Sablier | |
| 2012/0192767 A1 * | 8/2012 | Anderson | C04B 28/02 106/675 |
| 2016/0264468 A1 | 9/2016 | Burgos Enriquez | |

FOREIGN PATENT DOCUMENTS

| | | |
|---|---|---|
| CH | 585680 A5 | 3/1977 |
| CN | 1207374 A | 2/1999 |
| CN | 1293163 A | 5/2001 |
| CN | 102080427 A | 6/2011 |
| CN | 103755260 A | 4/2014 |
| DE | 2320785 A1 | 11/1974 |
| FR | 2384602 A1 | 10/1978 |
| JP | 57088063 A | 6/1982 |
| JP | 62059581 | 3/1987 |
| JP | 62256780 | 11/1987 |
| JP | 63288979 A | 11/1988 |
| JP | 0497931 A | 3/1992 |
| JP | 08225358 A | 9/1996 |
| JP | 10072268 A | 3/1998 |

(Continued)

*Primary Examiner* — Anthony J Green
(74) *Attorney, Agent, or Firm* — Haupman Ham, LLP (57) ABSTRACT

A lightweight structural concrete formulation comprises a wet mix of about 460 kg/m$^3$ of cementitious material such as ordinary Portland cement of which about 50 percent has been replaced by ground granulated basic furnace slag (GGBFS) and 7 percent by silica fume (SF) in other words the mix introduces between about 178 and 228 kg/m$^3$ therefore the combination is good to produce secondary reaction products when the cement hydrates which produces secondary calcium silicate hydrate (C—S—H) which makes the structure dense and thereby increases its mechanical durability characteristics of the concrete product. Possible ratios of GGBFS and SF are 30-70 percent and 5-10 percent, respectively. By making the structures dense increases the mechanical and durability characteristics of the concrete product. Other ratios have been made including GGBFS of 30-70 percent and silica fume 5-10 percent, respectively. It can be noted that the silica fume was added to the mixture as a supplementary cementitious material (SCM) not as an aggregate. It should also be noted that the particle sizes of GGBFS ranges between about 20-40 mm and that of silica fume is less than 20 mm.

12 Claims, 13 Drawing Sheets

(56) References Cited

FOREIGN PATENT DOCUMENTS

| | | | |
|---|---|---|---|
| JP | 2821822 | B2 | 11/1998 |
| JP | 2000281401 | A | 10/2000 |
| JP | 2001287978 | A | 10/2001 |
| JP | 2002068855 | A | 3/2002 |

* cited by examiner

LIGHTWEIGHT CONCRETE

FIELD OF THE INVENTION

This invention relates to a relatively lightweight concrete product and more particularly to a lightweight concrete product for structural purposes with exceptional heat and sound insulation. The resistance of concrete to chloride penetration and the corrosion rate of reinforcing steel during the lifespan of a structure are critical in ensuring long term durability of concrete structures. This invention is directed to the development of durable, structural lightweight concrete structures with perlite aggregates that may be exposed to a corrosive environment.

BACKGROUND OF THE INVENTION

Over the past ten or so years, there has been considerable research focused on developing lightweight concrete for structural purposes due to its obvious benefits including lightweight, exceptional heat and sound insulation. It has been recognized that the quality of concrete structures and enhancing the service life of structural products that the structures are therefore improved especially in areas of hazardous environmental conditions.

In considering harsh chemical conditions, the resistance of concrete to chloride penetration and the erosion rate of steel reinforcements during the lifespan of the structure are initial concerns. In the present case, Applicants' initial focus was on the durability of concrete structures and an ability to function within harsh environmental conditions and utilizing perlite aggregates together with silica fume to produce a lighter weight product.

An initial patentability search disclosed several approaches. For example, a publication from 1977, CH 585680 discloses a light concrete mortar preparation by adding expanded perlite and/or expanded clay or slate aggregates to cement binders having a dense structure and a bulk weight of 950-1200 kg/m$^3$ and compressive strength of about 140-180 kp/cm$^2$ was prepared by mixing cement and binders with ≥aggregates from expanded perlite and expanded clay, slate and/or etc. and water.

The mortar can be cast or molded to boards or other constructional materials. The mortar has high strength, does not unmix, has good surface properties without adding sand and can be worked in slab thicknesses ≥10 mm.

A German patent of Salzig, Wilhelm, DE 2320785(A1)—1974 that discloses perlite aggregate in a lightweight concrete and a concrete manufacturing process uses additions of perlite to the concrete in the mixer as a substitute for styropore or other products and can be injected into the concrete in a steam mechanism. The concrete is emptied from the mixer at 50-70° C. allowing the perlite to expand fully. The concrete has good heat and sound insulation and fire resistant properties.

Finally, two U.S. patents of Smetana et al., U.S. Pat. Nos. 5,114,617 and 5,356,446 relate to a high strength structural perlite concrete and to a low density insulating and fire resistant perlite concrete, respectively. The '617 patent relates to a wet mix of from 8 to 60 percent cement, 0.5 to 20 percent smooth-surfaced, vesicular, expanded perlite, 5 to 30 percent water, 0 to 12 percent pozzolan, and fine aggregate and coarse aggregate as appropriate and available in the circumstances. The concrete provides superior bond to reinforcing strands. The smooth-surfaced, vesicular, expanded perlite is unique and novel.

The second Smetana et al. patent, U.S. Pat. No. 5,356,446 relates to a method of providing thermal insulation and fire-resistance to buildings, by filling voids or spaces in and around structural members with a low density thermally insulating and fire-resistant cementitious composition containing a high proportion of a relatively smooth-surfaced, vesicular, expanded perlite. The method includes placing a flexible, woven, fire-resistant bag in the space to be filled, so as to act as a containment vessel, pumping a cementitious composition into the bag to fill a space by conforming to the shape of the space, while the bag simultaneously contains the cementitious composition in the desired position, and allowing the composition to cure into a lightweight, fire-resistant, and thermally insulating concrete. The method is particularly useful in and directed to remedial, post-construction applications in occupied buildings

SUMMARY OF THE INVENTION

In essence the present invention contemplates a lightweight structural product made from about 30-70% of cementitious materials as for example ordinary Portland Type I cement (OPC), 5-10% silica fume, 0.5% superplasticizer (Poly-carboxylate based superplasticizer was used in the study) and 10 to 20% perlite aggregate and the balance of coarse and fine aggregates to complete 100%.

In a preferred embodiment of the invention about 50% of the cementitious material is replaced with ground granulated basic furnace slag (GGBFS) and 7% silica fume (SF). The GGBFS is high in CaO and silica fume is very rich in $SiO_2$ (up to 92%). Therefore, the combination produces secondary reaction product when the cement hydrates which produces secondary calcium silicate hydrate (C—S—H) which makes the structure dense thereby increasing mechanical and durability characteristics of the concrete product.

The preferred embodiment of the invention includes GGBFS of 30-70% and 5-10% of silica fume (SF). The silica fume have been added in the mixture as a supplementary cementitious material (SCM) not as an aggregate, to improve the strength and durability of the concrete product.

The following table of concrete mix and design parameters suggest numerous embodiments of the invention and are defined as comprising and/or consisting of to illustrate the broader concept and provide claims of specific compounds as embodiments of consisting of.

TABLE 1

Concrete mix design parameters

| | Perlite Agg., % | Water/ Cement | OPC kg/m$^3$ | GGBFS kg/m$^3$ | SF kg/m$^3$ | Coarse Agg. kg/m$^3$ | Fine Agg. kg/m$^3$ | Perlite Agg. kg/m$^3$ |
|---|---|---|---|---|---|---|---|---|
| M0 | 0 | 0.25 | 198 | 230 | 32 | 1218 | 655 | 0 |
| M10 | 10 | 0.25 | 198 | 230 | 32 | 674 | 336 | 112 |

TABLE 1-continued

Concrete mix design parameters

| | Perlite Agg., % | Water/Cement | OPC kg/m³ | GGBFS kg/m³ | SF kg/m³ | Coarse Agg. kg/m³ | Fine Agg. kg/m³ | Perlite Agg. kg/m³ |
|---|---|---|---|---|---|---|---|---|
| M15 | 15 | 0.25 | 198 | 230 | 32 | 560 | 233 | 140 |
| M20 | 20 | 0.25 | 198 | 230 | 32 | 482 | 160 | 160 |

The invention will now be described in connection with the accompanying drawings wherein like reference numbers are used to identify like parts.

DETAILED DESCRIPTION OF THE PREFERRED EMBODIMENTS OF THE INVENTION

An initial embodiment of the invention is directed to a lightweight structural concrete comprising (made from) a wet mix of ordinary Portland cement (OPC) about 178 to about 228 kg/m³; GGBFS between about 207 and 253 kg/m³; between about 29 and 35 kg/m³ Silica Fume (SF); between about 100 and 176 kg/m³ perlite aggregate, plus minor amounts of coarse and fine aggregates plus 0.5 percent of a polycarboxylate superplasticizer.

A second embodiment of the invention includes between about 482 and 1218 kg/m³ coarse aggregate and between about 160 and 655 kg/m³ fine aggregates.

Preparation and Testing of Concrete Specimens

Figure 1:
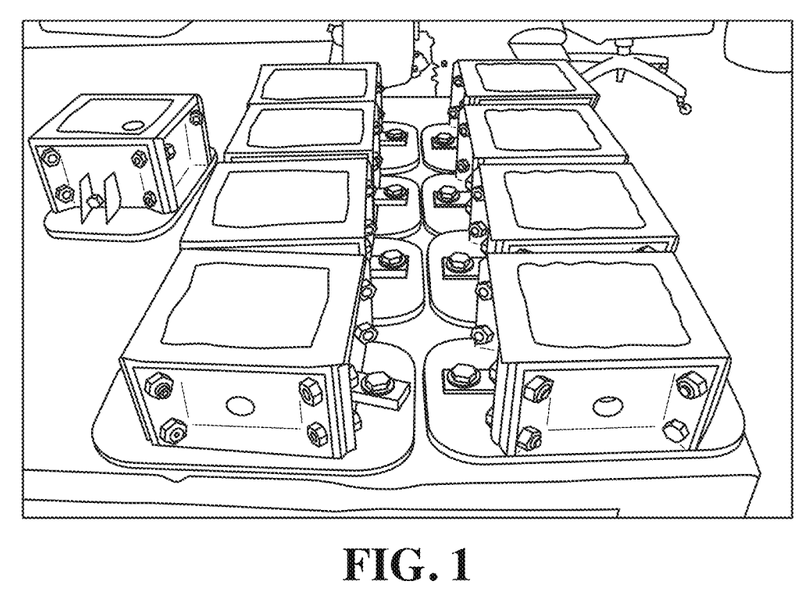
FIG. 1 is a photograph of the molded cubical specimens of various concrete mixtures.
Figure 2:
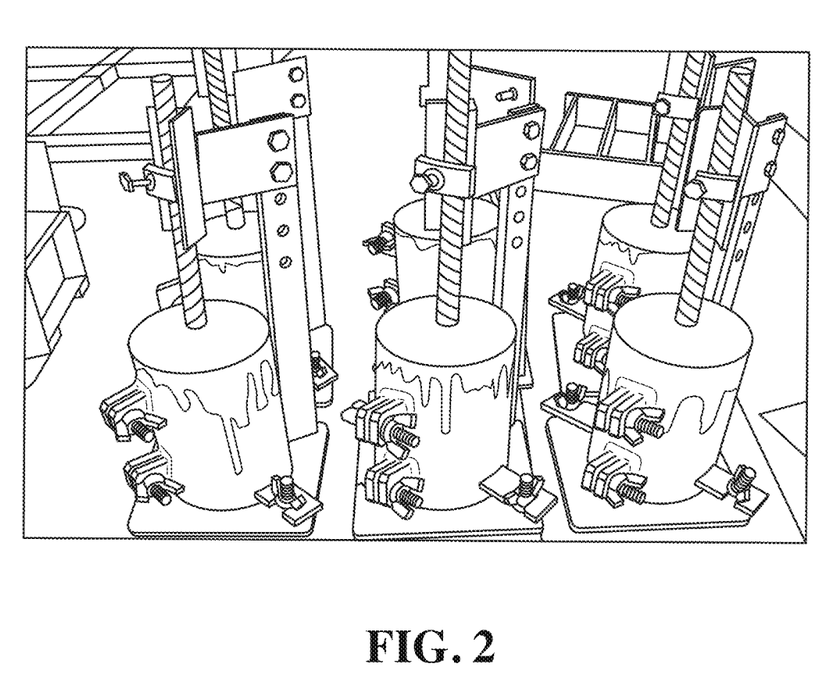
FIG. 2 is a photograph of molded cylindrical specimens of the concrete mixtures.
Figure 3:
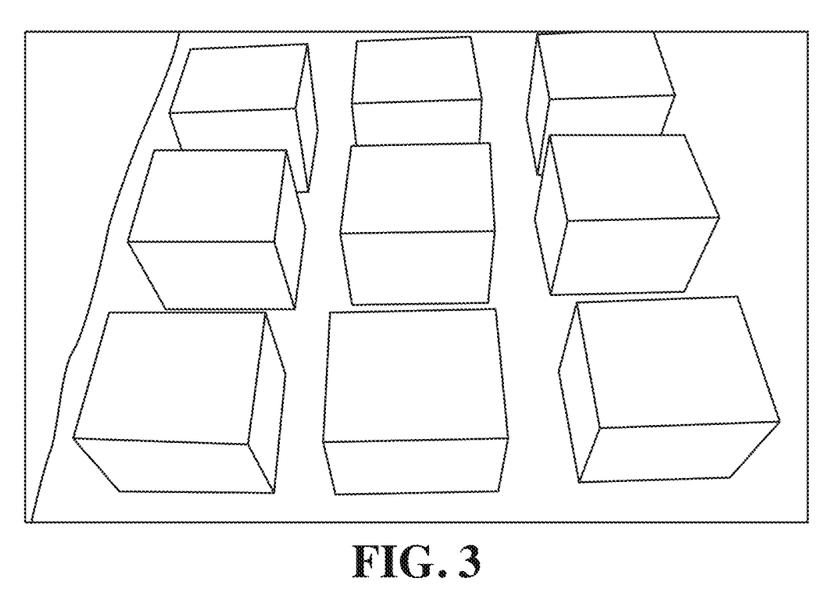
FIG. 3 is a photograph of de-molded concrete specimens.

The concrete specimens for the four concrete mixes were tested according to the ASTM standards at different curing periods to evaluate the mechanical and durability properties as per the schedule of curing. FIGS. 1 and 2 shows the cube and cylindrical specimens being prepared for concrete mixtures, respectively. FIG. 3 illustrates de-molded specimens ready to start curing. The tests conducted and frequency together with the sample sizes is shown in Table 2.

TABLE 2

Specimen sizes for different test conducted.

| Task | Specimen size, mm | Testing ages |
|---|---|---|
| Unit Weight as per ASTM C138 | 100 × 100 cube | One day |
| Evolution of Compressive Strength fc' as per ASTM C39 | 100 × 100 cube | 1, 3, 7, 14, 28 and 90 |
| Evaluation of shrinkage as per ASTM C 157 | 50 × 50 × 250 prism | Periodic monitoring after 28 days of curing |
| Chloride permeability as per ASTM C1202 | 100 × 200 cylinder | 28 and 90 days of curing |
| Water absorption as per ASTM C642 | 75 × 150 cylinder | 28 and 90 days of curing |
| Reinforcement Corrosion as per ASTM C876 | 75 × 150 cylinder | Periodic monitoring after 28 days of curing |
| Thermal conductivity | 350 × 350 × 50 slab | 14 days of curing |

Results and Discussion

Unit Weight and Compressive Strength

Figure 4:
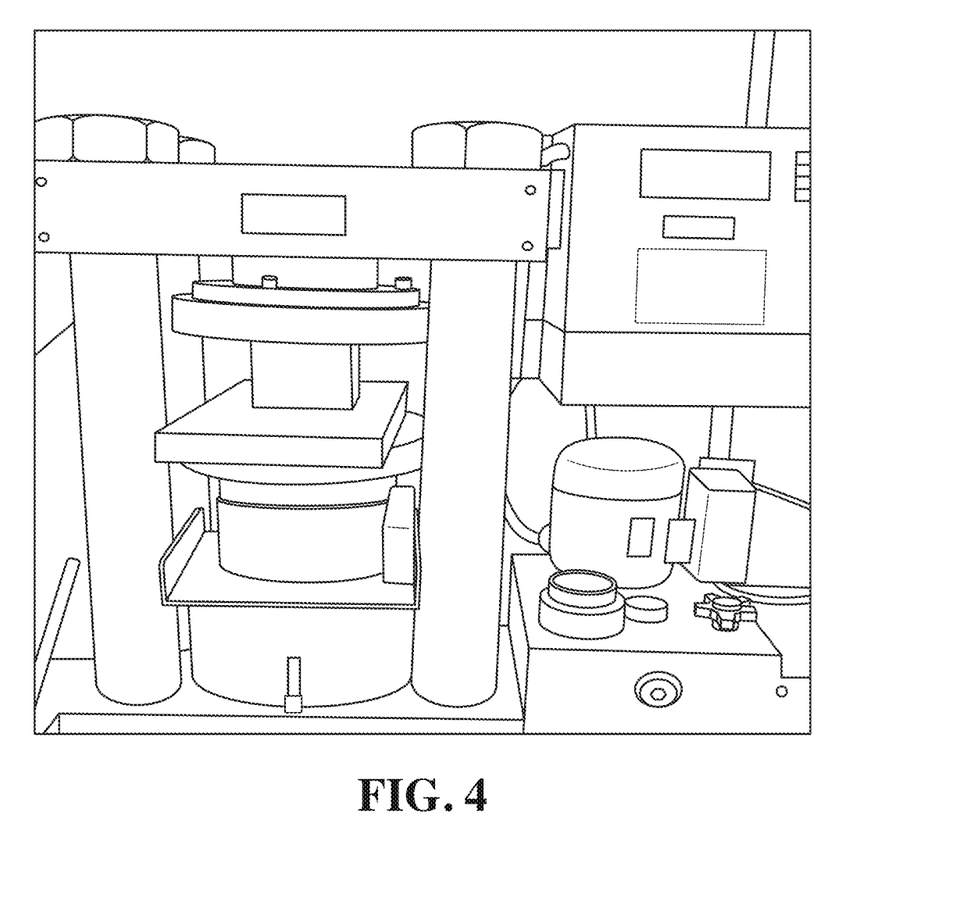
FIG. 4 is a photograph of the compressive testing machine used in evaluating the mixtures in accordance with the present invention.
Figure 5:
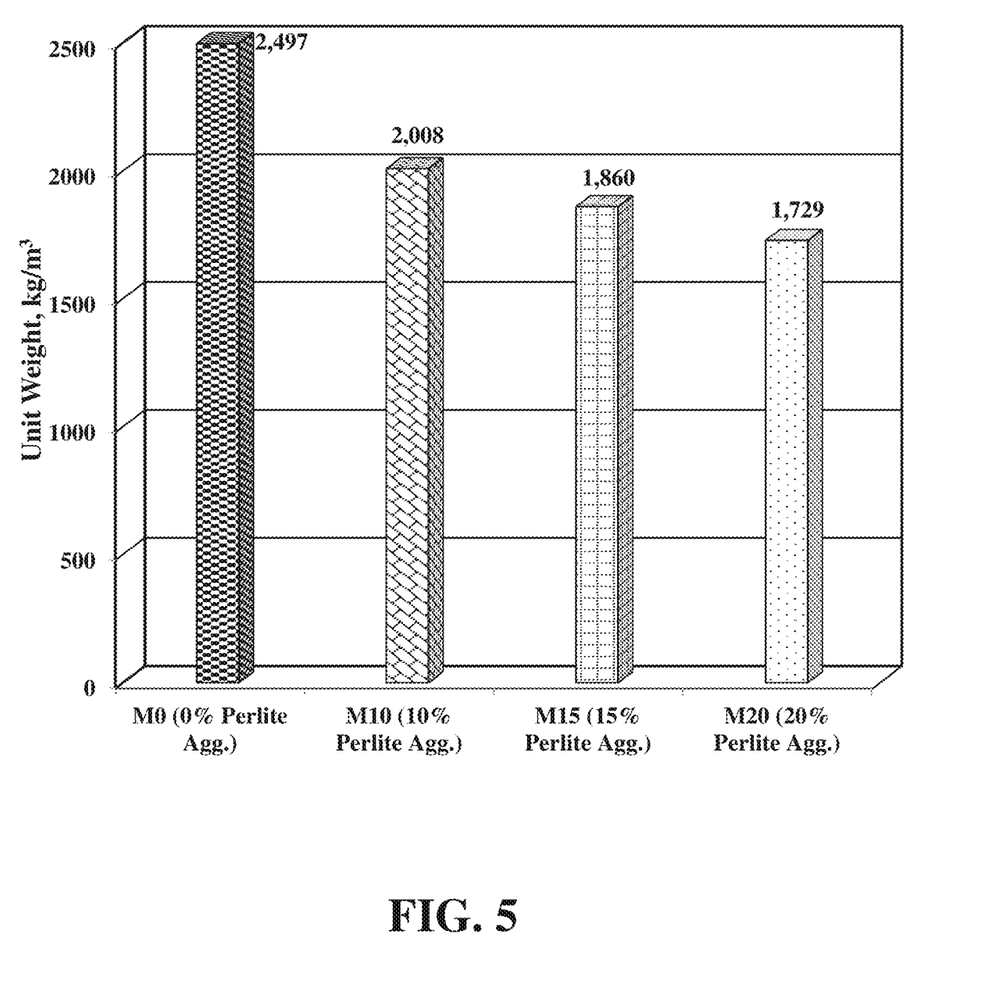
FIG. 5 is a graphical illustration of the unit weight in the different concrete mixtures prepared with perlite aggregate.
Figure 6:
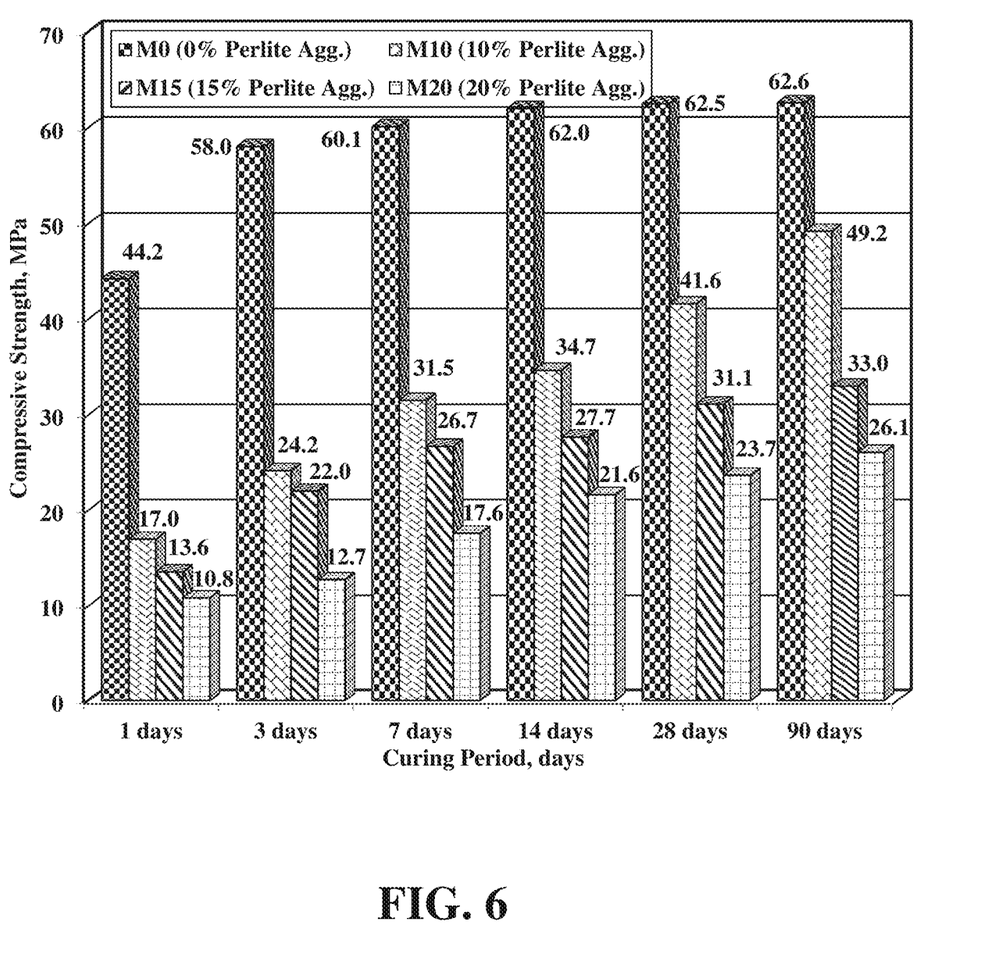
FIG. 6 is a graphical illustration of a comparison of compressive strength in the concrete specimens prepared with perlite aggregate.
Figure 7:
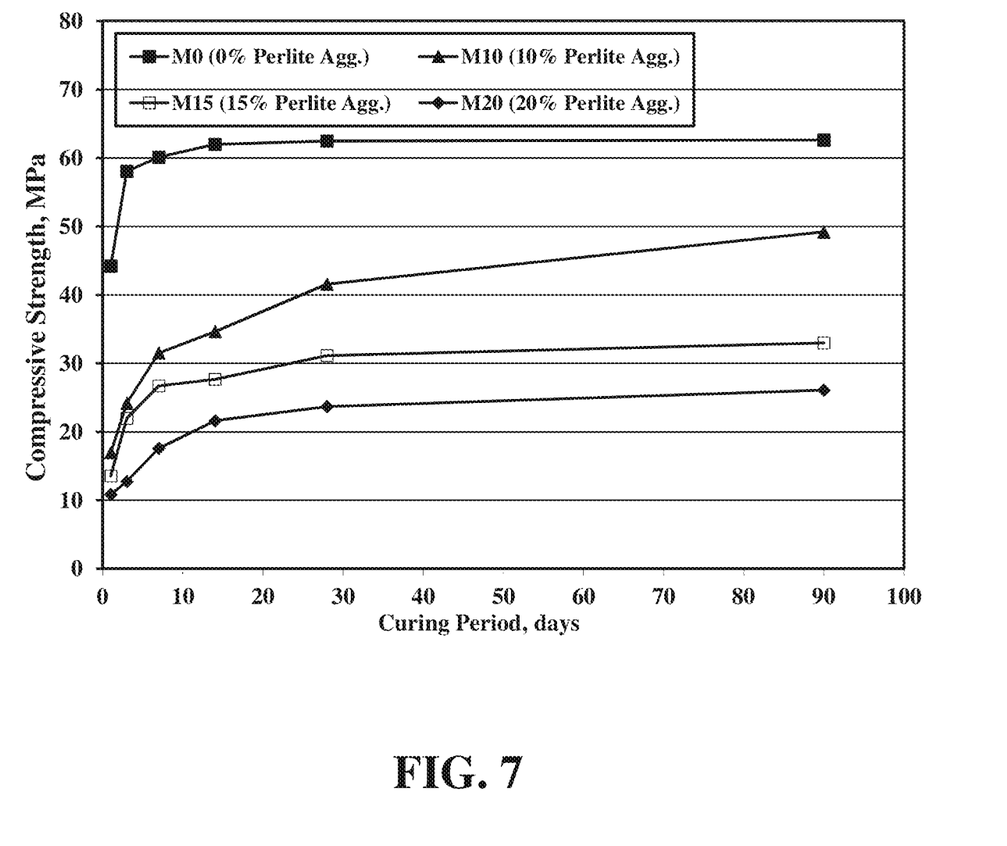
FIG. 7 is a graphical illustration of the compressive strength in MPa versus evolution of compressive strength in the concrete specimens prepared with and without perlite aggregate.

Unit weight of concrete was measured after demolding the concrete specimens after one day of casting before being cured by immersing in potable water. Digital compressive strength testing machine as shown in FIG. 4 was used to determine the strength of different concrete mixtures. The unit weights of developed concrete mixes are shown in FIG. 5. FIG. 6 shows the comparison of compressive strength with time in the four concrete mixtures cured under water for three months. Additionally, the compressive strength results are also illustrated in a line plot as depicted in FIG. 7. Unit weight was in the range of 1700 kg/m³ to 2500 kg/m³, the lowest being in the 20% perlite aggregate concrete (M20), while, highest for the concrete without perlite aggregate (M0). There was a reduction in unit weight from 20% to 30% in the various mixtures of concrete containing perlite aggregate as compared to the one having no lightweight aggregate.

The compressive strength increased with curing period in all the concrete mixtures. 28 days compressive strength in the concrete mixes containing, 10%, 15% and 20% perlite aggregate was 41.6 MPa. 31.1 MPa and 23.7 MPa, respectively. However, compressive strength of concrete without perlite aggregate after 28 days of curing was 62.5 MPa. There was a marginal increase in the compressive strength in the concrete mixtures when curing extended up to 90 days. At the end of 90 days curing compressive strength was 49.2 MPa, 33.0 MPa and 26.1 MPa, respectively, for mixtures containing 10%, 15% and 20% perlite aggregate. The developed concrete mixtures, particularly prepared with 10% and 15% perlite aggregate, can be utilized as structural concrete as the compressive strength is more than 30 MPa. Moreover, concrete mixture prepared with 10% perlite aggregate developed compressive strength of the order 49.2 MPa at the end of 90 days curing in which there was 20% reduction in unit weight as compared to concrete mixture containing no perlite aggregate.

Water Absorption

In order to determine the water absorption of the concrete mixtures after completing a specified number of days of curing, cylindrical specimens were dried at 110° C. in the oven approximately 24 hours until attaining a constant weight, subsequently the specimens were saturated in the water for about 48 hours. Resulting water absorption is calculated in terms of percentage and demonstrated in the FIG. 8 for different concrete mixtures prepared with and without perlite aggregate.

Figure 8:
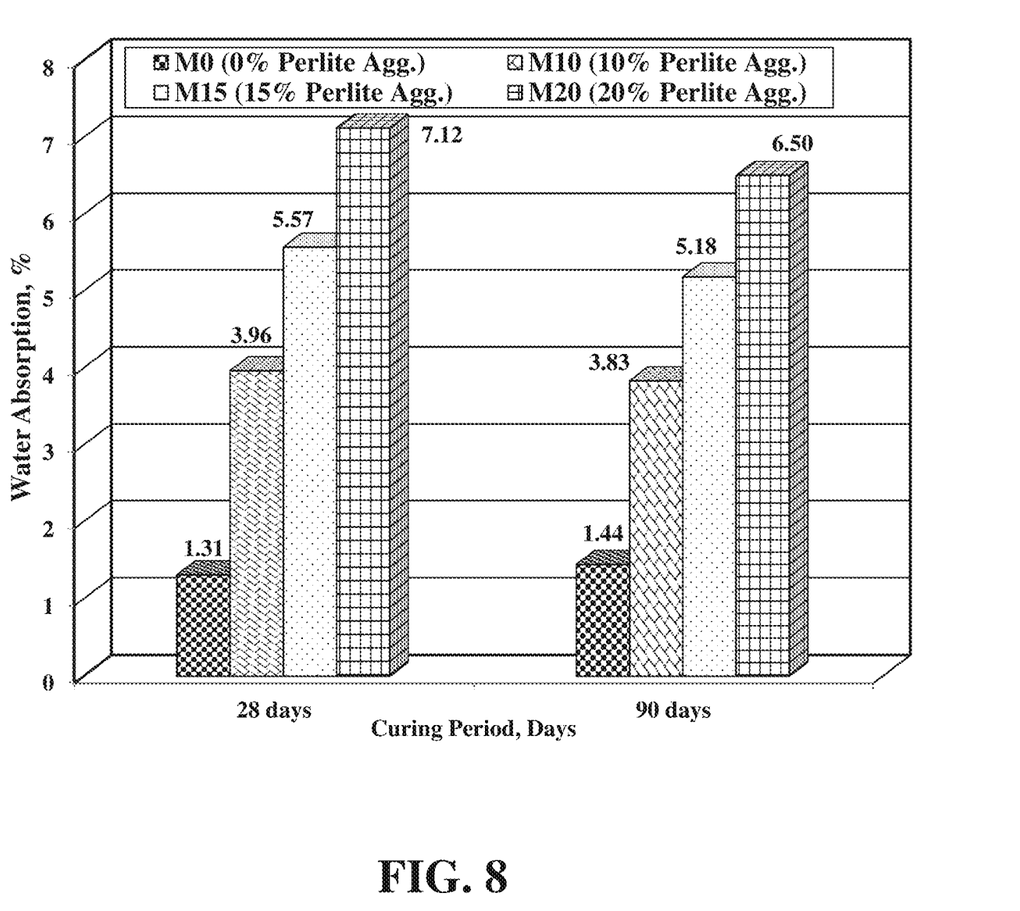
FIG. 8 is a graphical illustration of water absorption in the different concrete mixtures prepared with and without perlite aggregate.

The results show that the water absorption was in the range of 1.31% to 7.12% and 1.44% and 6.50%, in the concrete specimens cured for 28 and 90 days of curing, respectively. Water absorption reduced marginally when the curing extended from 28 days to 90 days. Perlite aggregate concrete performed well, particularly at 10% and 15% replacement levels, according to water absorption results as the values are comparable to OPC concrete used in the field.

Chloride Permeability

Figure 9:
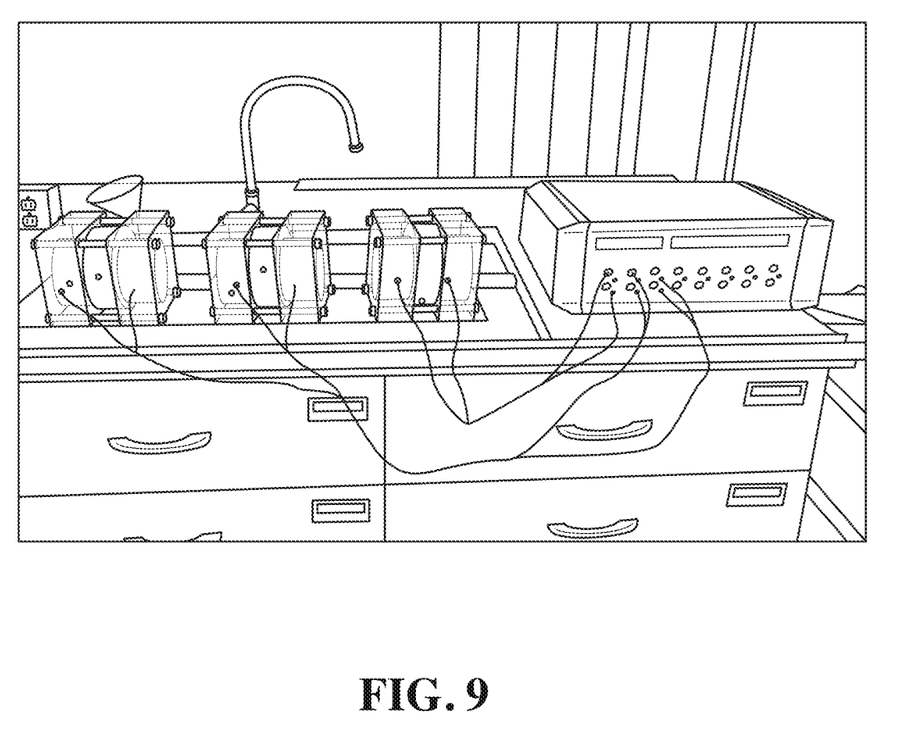
FIG. 9 is a photograph of the laboratory set-up for permeability testing.
Figure 10:
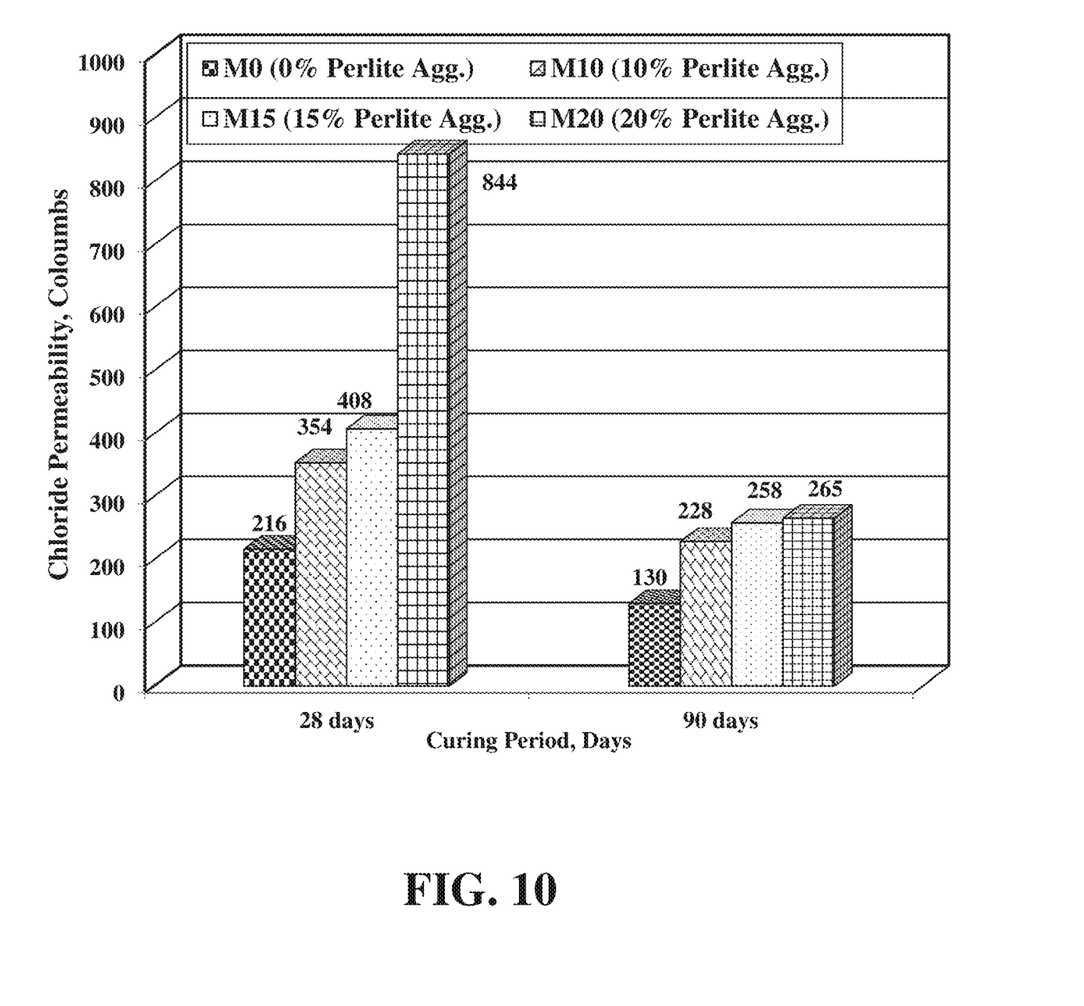
FIG. 10 is a graphical illustration of chloride permeability in the concrete specimens prepared by incorporating perlite aggregate.

FIG. 9 shows a set-up used to determine chloride permeability, a key durability parameter. The chloride permeability in the concrete mixes M0, M10, M15 and M20 prepared with 0%, 10%, 15% and 20% perlite aggregate, respectively, after 28 and 90 days of curing is depicted in FIG. 10. As expected, the chloride permeability decreased with curing age in all the concrete specimens. Chloride permeability is highest in concrete specimens for mix M20 and lowest for mix M0 after 28 and 90 days of curing. In the concrete mix, prepared with a 20% perlite aggregate, chloride permeability is greatly reduced when the curing extended from 28 days to 90 days.

For specimens cured for 28 days, chloride permeability in the mixes M0, M10, M15 and M20 are 216, 354, 408 and 844 coulombs respectively. After 90 days of curing, the chloride permeability of mixes M0, M10, M15 and M20 decreases to 130, 228, 258 and 265 coulombs, respectively. Table 3 shows the ASTM C1202 classification of concrete quality based on permeability. The chloride permeability in the concrete mixtures prepared with and without perlite aggregate at all curing periods, fall into "Very Low" category as per ASTM C 1202. These results indicate "very low" penetrability of chloride in all the concrete mixtures.

TABLE 3

ASTM C1202 chloride permeability classification.

| Charge Passed, Coulombs | Penetrability |
|---|---|
| >4000 | High |
| 2000-4000 | Moderate |
| 1000-2000 | Low |
| 100-1000 | Very Low |
| <100 | Negligible |

Drying Shrinkage

Figure 11:
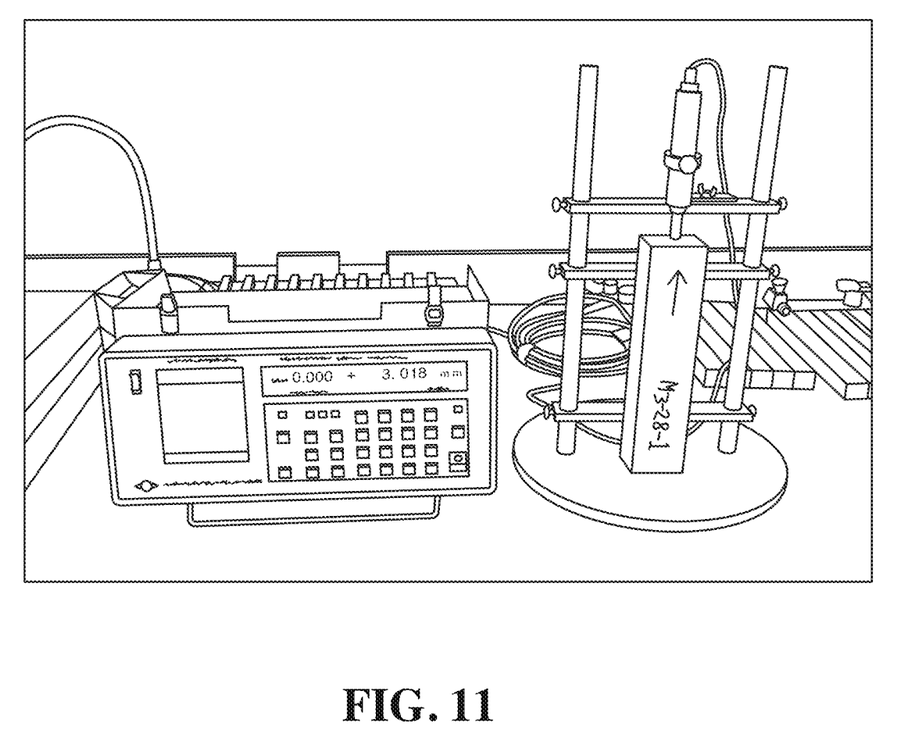
FIG. 11 is a photograph of the data acquisition system used to measure drying shrinkage.
Figure 12:
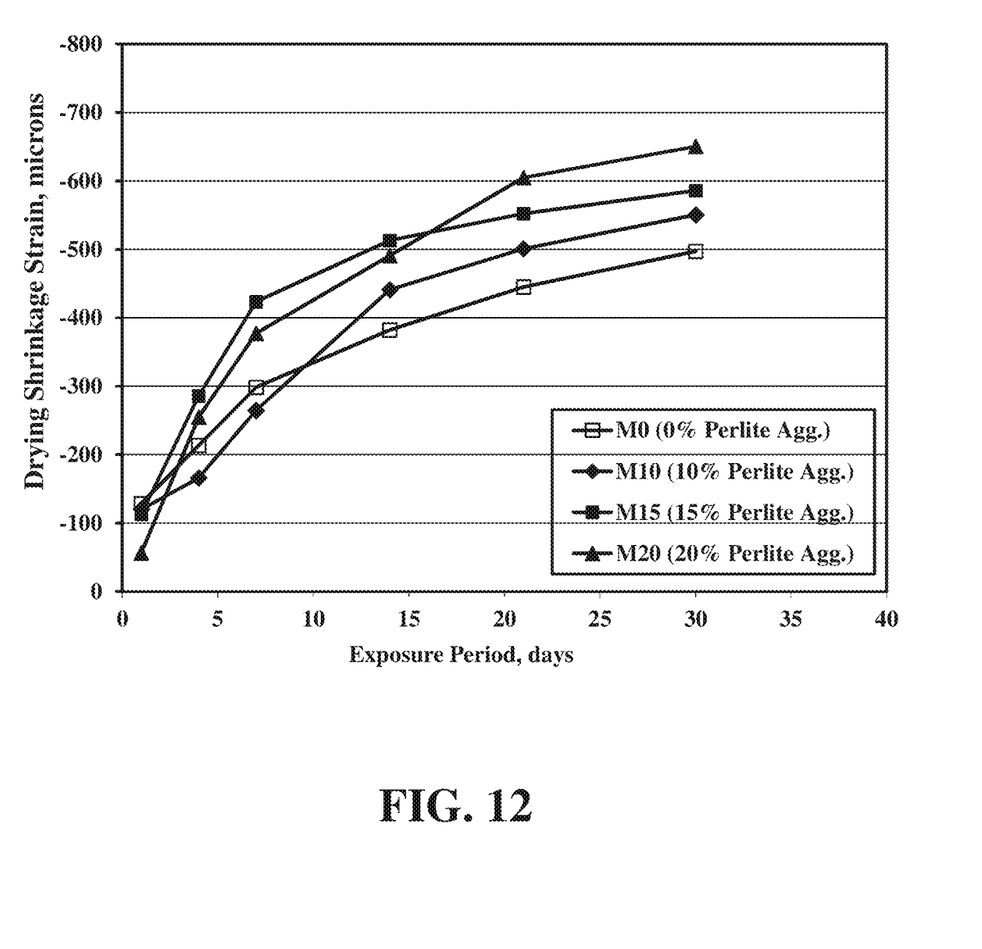
FIG. 12 is a graphical illustration showing the drying shrinkage strains of various concrete mixes.

FIG. 11 illustrates the data acquisition system used to measure drying shrinkage strain with the help of linear variable differential transducer (LVDT). The drying shrinkage strain in the concrete specimens is depicted in FIG. 12. The drying shrinkage strain increased with time in all the concrete specimens. Also, it increased with increasing perlite aggregate content. According to the data available to date (28 days) the drying shrinkage strain in all concrete mixes is less than 700 microns. The drying shrinkage strains recorded in the concrete mixtures M0, M10, M15 and M20 are 650, 585, 550 and 497 microns, respectively.

Thermal Resistance

Figure 13:
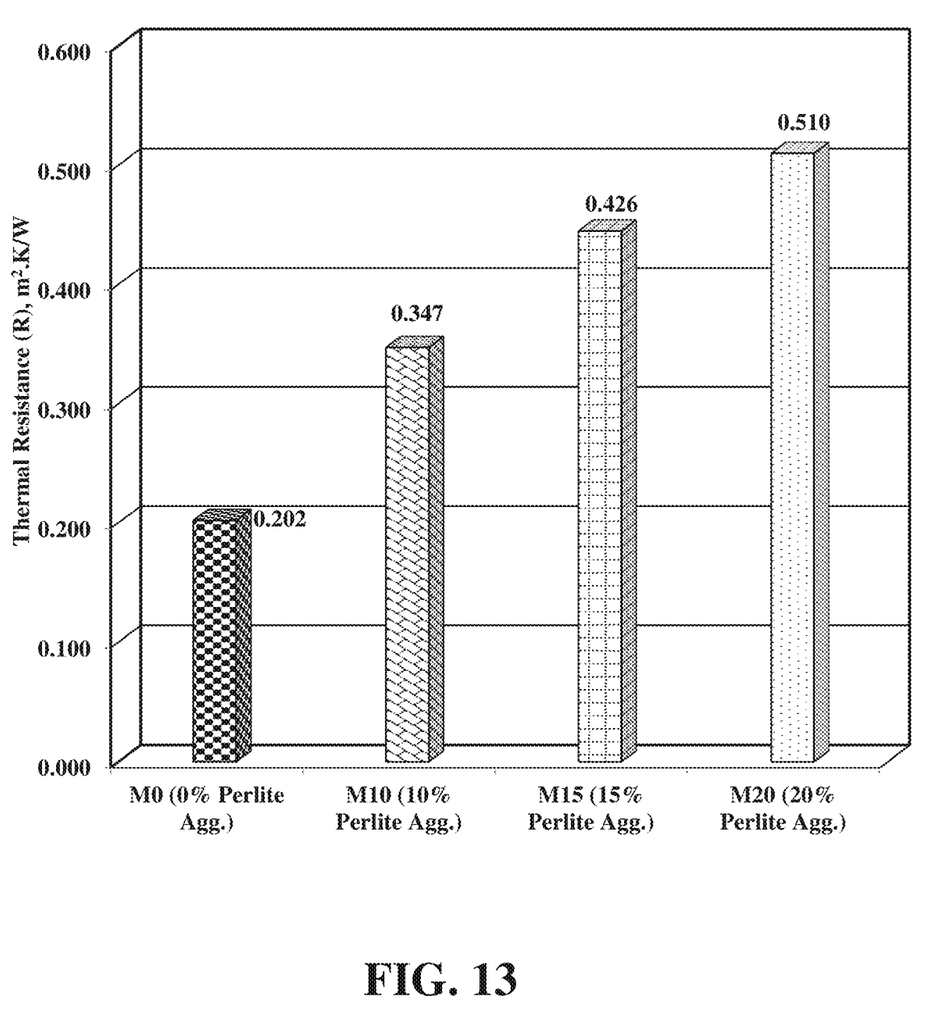
FIG. 13 is a graphical illustration of the thermal resistance of concrete specimens prepared with varying quantities of perlite aggregate.

The thermal performance of the concrete mixtures prepared with and without perlite aggregate was determined by using 35 cm×35 cm×5 cm slab specimen. Thermal resistance of all the concrete mixtures prepared in the study is demonstrated in FIG. 13. Thermal resistance increased with increasing the perlite aggregate content. The highest resistance of 0.510 $m^2$ K/W was measured in the concrete mix, prepared with a 20% perlite aggregate, while, it was 0.202 $m^2$K/W in the mixture without perlite aggregate. Therefore, there was more than two and half times more thermal resistance in the 20% perlite aggregate concrete as compared to the mixture containing no perlite aggregate.

CONCLUSIONS

The data developed in this study indicate that there was 20 to 30% reduction in the weight of concrete in the mixes prepared by incorporating perlite aggregate. The developed concrete mixtures can be potentially used for structural purposes as the compressive strength is more than 30 MPa, particularly for the concrete mixtures prepared with 10 and 15% perlite aggregate. Durability performance of the concrete mixtures prepared in the study was satisfactory as the water absorption and chloride permeability of the developed concrete was reasonably low. The chloride permeability, a key durability parameter, in the concrete mixtures prepared with and without perlite aggregate at all curing periods, fall into "Very Low" category as per ASTM C 1202. These results indicate "very low" penetrability of chloride in all the concrete mixtures. According to the data available to date, drying shrinkage strain in the concrete mixtures is comparable to OPC concrete used in the field. Another important aspect of the study is that the thermal resistance of the developed concrete mixtures utilizing perlite aggregate is high as compared to the mix containing no perlite aggregate. There was more than two and half times more resistance in the concrete mixture containing 20% perlite aggregate as compared to the control mix. Therefore, according to the results of this endeavor, developed light weight durable concrete mixtures could be potentially useful in structural elements with high thermal resistance.

Advantages of the Developed Product

Following are the advantages of the developed concrete mixtures:

i. Developed concrete mixtures are 20 to 30% lighter than the conventional concrete.

ii. Due to the fact that the compressive strength of developed concrete is more than 30 MPa, could be potentially utilized for structural purposes. Moreover, the concrete mixture containing 10% perlite aggregate after 90 days of curing developed strength close to 50.0 MPa, which is quite high.

iii. Enhanced service-life of concrete structures as the key durability parameters of the developed concrete are excellent as compared to the other lightweight concretes being used in the construction industry.

iv. Reduction in the quantity of cement, as a result of partially replacing it with industrial byproducts, leading to a decrease in the carbon footprint of the construction industry.

v. The added advantage of the developed concrete mixtures is that, their thermal resistance is high which will result in energy saving of buildings.

Limitations

There are no limitations on the use of the developed concrete mixtures, as long as the silica fume and GGBFS that are used in their preparation meet the relevant specifications (ASTM C1240 for silica fume and ASTM C989 for Blast Furnace Slag).

While the invention has been defined in accordance with its preferred embodiments, it should be recognized that changes and modifications may be made therein without departing from the scope of the appended claims.

What is claimed is:

1. A lightweight structural concrete comprising:
   a wet concrete mix of
   198 kg/m$^3$ ordinary Portland cement,
   232 kg/m$^3$ ground-granulated blast-furnace slag (GGBFS),
   32 kg/m$^3$ silica fume (SF),
   140 kg/m$^3$ perlite aggregate,
   water in an amount of water/cement of 0.25, and
   a mixture of additional coarse and fine aggregate other than perlite.

2. A lightweight structural concrete product comprising:
   a wet mix of
   between 178 and 228 kg/m$^3$ ordinary Portland cement,
   between 207 and 253 kg/m$^3$ ground-granulated blast-furnace slag (GGBFS),
   between 29 and 35 kg/m$^3$ silica fume, and
   between 100 and 176 kg/m$^3$ perlite aggregates.

3. A lightweight structural concrete product according to claim 2, wherein:
   the perlite aggregates are present in amount of between 110 and 160 kg/m$^3$.

4. A lightweight structural concrete product according to claim 3, wherein:
   the perlite aggregates are present in amount of 112 kg/m$^3$.

5. A lightweight structural concrete product according to claim 3, wherein:
   the perlite aggregates are present in amount of 140 kg/m$^3$.

6. A lightweight structural concrete product according to claim 3, wherein:
   the perlite aggregates are present in amount of 160 kg/m$^3$.

7. A lightweight structural concrete product consisting of:
   a wet mix of
   between 178 and 228 kg/m$^3$ ordinary Portland cement,
   between 207 and 253 kg/m$^3$ ground-granulated blast-furnace slag (GGBFS),
   between 29 and 35 kg/m$^3$ silica fume, and
   between 100 and 176 kg/m$^3$ perlite aggregates.

8. The lightweight structural concrete product according to claim 7, wherein:
   the perlite aggregates are present in amount of between 110 and 160 kg/m$^3$.

9. The lightweight structural concrete product according to claim 7, wherein:
   the wet mix consists of 112 kg/m$^3$ of the perlite aggregates.

10. The lightweight structural concrete product according to claim 7, wherein:
    the wet mix consists of 140 kg/m$^3$ of the perlite aggregates.

11. The lightweight structural concrete product according to claim 7, wherein:
    the wet mix consists of 160 kg/m$^3$ of the perlite aggregates.

12. A lightweight concrete structure comprising:
    a cured mass of a wet mix of a lightweight structural concrete product according to claim 7.

* * * * *